United States Patent [19]

de Jong et al.

[11] Patent Number: 5,155,169

[45] Date of Patent: Oct. 13, 1992

[54] BLENDS COMPRISING A POLYPHENYLENE ETHER, A FLUORINE-CONTAINING OLEFINIC POLYMER AND A VINYL AROMATIC ALKYL (METH) ACRYLATE COPOLYMER

[75] Inventors: Robertus E. de Jong; Jean M. Heuschen, both of Evansville, Ind.; Roger W. Avakian, Brasschaat, Belgium; Roelof van der Meer, JE Halsteren, Netherlands

[73] Assignee: General Electric Company, Selkirk, N.Y.

[21] Appl. No.: 567,921

[22] Filed: Aug. 15, 1990

Related U.S. Application Data

[63] Continuation of Ser. No. 211,962, Jun. 27, 1988, abandoned.

[30] Foreign Application Priority Data

Jul. 10, 1987 [NL] Netherlands ............ 8701625

[51] Int. Cl.⁵ .................. C08L 51/00; C08L 53/02
[52] U.S. Cl. ............................. 525/72; 525/85; 525/92; 525/905
[58] Field of Search ................. 525/92, 905, 72

[56] References Cited

U.S. PATENT DOCUMENTS

| | | |
|---|---|---|
| 3,257,357 | 6/1966 | Stamatoff . |
| 3,257,358 | 6/1966 | Stamatoff . |
| 3,306,874 | 2/1967 | Hay . |
| 3,306,875 | 2/1967 | Hay . |
| 4,111,894 | 9/1978 | Gergen et al. ............... 525/92 |
| 4,762,874 | 8/1988 | Hambrecht et al. ........ 525/905 |

FOREIGN PATENT DOCUMENTS

| | | |
|---|---|---|
| 0076539 | 4/1983 | European Pat. Off. . |
| 0076539 | 9/1982 | France . |

Primary Examiner—Jacob Ziegler
Attorney, Agent, or Firm—Hedman, Gibson & Costigan

[57] ABSTRACT

The invention relates to polymer mixtures which comprise a polyphenylene ether, a fluorine-containing olefinic polymer or copolymer and a vinyl-aromatic alkyl(-meth)acrylate copolymer. Polymer mixtures having improved properties are obtained by the addition of a di- or triblock copolymer with one or more blocks derived from conjugated diene units and with one or more blocks derived from vinylaromatic units.

20 Claims, No Drawings

BLENDS COMPRISING A POLYPHENYLENE ETHER, A FLUORINE-CONTAINING OLEFINIC POLYMER AND A VINYL AROMATIC ALKYL (METH) ACRYLATE COPOLYMER

This is a continuation of application Ser. No. 211,962 filed Jun. 27, 1988, now abandoned.

The invention relates to a polymer mixture which comprises a polyphenylene ether, a fluorine-containing olefinic homopolymer or copolymer, and a vinylaromatic alkyl(meth)acrylate copolymer.

Polymer mixtures of the type described hereinbefore are known from T. Ouhadi et al, Molecular Design of Multicomponent Polymer Systems, Journal of Polymer Science: Part B: Polymer Physics, Vol 24, 973–981 (1986). The known polymer mixtures comprise a blend of a rubber-modified PS/PPO ® mixture and polyvinylidene fluoride to which a linear poly(styrene-b-alkyl(meth)acrylate) has been added. As a poly(styrene-b-alkyl(meth)acrylate) is used the product as it is obtained by sequential anionic polymerisation of styrene and alkyl(meth)acrylate. The method of preparing this linear product is described in EP-A-0 076 539. The addition of poly(styrene-b-alkyl(meth)acrylate) results in a change in morphology, improves the tensile strength and the elongation at fracture.

From experiments performed by the Applicants, however, it has been found that the impact strength, in particular the notch impact strength according to IZOD is reduced by the addition of a poly(styrene-alkyl(meth)acrylate) copolymer.

The invention is based on the discovery that, by the addition of a further constituent, namely a block copolymer as defined hereinafter as constituent D, a polymer mixture is obtained having an even improved elongation at fracture and a considerably improved impact strength. The tensile strength is only little reduced.

The polymer mixture according to the invention is characterised in that the polymer mixture comprises:
A. 10–90% by weight of a polyphenylene ether,
B. 10–90% by weight of a fluorine-containing olefinic homopolymer or copolymer, the weight percentages of A and B being calculated with respect to the sum of the quantities by weight of A plus B,
C. 1–80 parts by weight of a vinylaromatic alkyl(meth)acrylate copolymer,
D. 1–20 parts by weight of an, optionally partially hydrogenated, block copolymer having one or more blocks derived from conjugated diene units and having one or more blocks derived from vinylaromatic units,
E. 0–200 parts by weight of a styrene homopolymer and/or rubber-modified styrene polymer, and
F. 0–50 parts by weight of conventional additives, the parts by weight of C, D and E being calculated per 100 parts by weight of A+B.

The polymer mixture according to the invention preferably comprises as constituent C a non-linear vinylaromatic alkyl(meth)acrylate copolymer.

The polymer mixture according to the invention preferably comprises 30–70% by weight of constituent A and 70–30% by weight of constituent B, the weight percentages of A and B being calculated with respect to the sum of the quantities by weight of A plus B.

The polymer mixture according to the invention preferably comprises 1–50 parts by weight of constituent C per 100 parts by weight of A plus B.

The polymer mixture according to the invention preferably comprises as constituent B a polymer or a copolymer which is built up for more than 25 mol % of units derived from vinyl fluoride and/or vinylidene fluoride.

The polymer mixture according to the invention comprises at any rate the following constituents:
A. a polyphenylene ether,
B. a fluorine-containing olefinic polymer or copolymer,
C. a vinylaromatic alkyl(meth)acrylate copolymer, and
D. a block copolymer.

The polymer mixture according to the invention may moreover comprise one or more of the following constituents:
E. a styrene homopolymer or rubber-modified styrene homopolymer, and
F. conventional additives.

A. POLYPHENYLENE ETHERS

Polyphenylene ethers are compounds known per se. For this purpose, reference may be made to the U.S. Pat. Nos. 3,306,874, 3,306,875; 3,257,357 and 3,257,358. Polyphenylene ethers are usually prepared by an oxidative coupling reaction—in the presence of a copper amine complex—of one or more two-fold or three-fold substituted phenols, homopolymers and copolymers, respectively, being obtained. Copper amine complexes derived from primary, secondary and/or tertiary amines may be used. Examples of suitable polyphenylene ethers are:
poly(2,3-dimethyl-6-ethylphenylene-1,4-ether)
poly(2,3,6-trimethylphenylene-1,4-ether)
poly[2-(4'-methylphenyl)phenylene-1,4-ether]
poly(2-bromo-6-phenylphenylene-1,4-ether)
poly(2-methyl-6-phenylphenylene-1,4-ether)
poly(2-phenylphenylene-1,4-ether)
poly(2-chlorophenylene-1,4-ether)
poly(2-methylphenylene-1,4-ether)
poly(2-chloro-6-ethylphenylene-1,4-ether)
poly(2-chloro-6-bromophenylene-1,4-ether)
poly(2,6-di-n-propylphenylene-1,4-ether)
poly(2-methyl-6-isopropylphenylene-1,4-ether)
poly(2-chloro-6-methylphenylene-1,4-ether)
poly(2-methyl-6-ethylphenylene-1,4-ether)
poly(2,6-dibromophenylene-1,4-ether)
poly(2,6-dichlorophenylene-1,4-ether)
poly(2,6-diethylphenylene-1,4-ether)
poly(2,6-dimethylphenylene-1,4-ether)

Copolymers, for example, copolymers derived from two or more phenols as used in the preparation of the homopolymers mentioned hereinbefore, are also suitable. Furthermore suitable are graft copolymers and block copolymers of vinylaromatic compounds, for example, polystyrene and of polyphenylene ether as described hereinbefore.

B. FLUORINE-CONTAINING OLEFINIC POLYMERS OR COPOLYMERS

Fluorine-containing olefinic polymers or copolymers are known per se. Only polymers behaving like thermoplastic synthetic resin may be used in the polymer mixtures according to the invention.

Particularly suitable are the homo- or copolymers which are built up for more than 25 mol %, even more preferably more than 45 mol %, from units derived from vinyl fluoride and/or vinylidene fluoride. Examples of such homopolymers are polyvinylidene fluoride, polyvinyl fluoride or mixtures of these two homopolymers. Copolymers built up from units derived from vinylidene fluoride and vinyl fluoride are also suitable. Further suitable copolymers are the copolymers which on the one hand comprise units derived from vinylidene fluoride and/or vinyl fluoride and which on the other hand comprise units derived from hexafluoropolypropylene and/or chlorotrifluoroethylene and/or tetrafluoroethylene.

C. VINYLAROMATIC ALKYL(METH)ACRYLATE COPOLYMERS

Vinylaromatic alkyl(meth)acrylate copolymers are to be understood to mean herein copolymers which comprise units derived from a vinylaromatic compound, for example, styrene and units derived from alkyl(meth)acrylate, for example, methylmethacrylate. More in particular those compounds are meant which comprise one or more blocks built up from several units derived from a vinylaromatic compound and one or more blocks built up from several units derived from an alkyl(meth)acrylate. Various structures are possible, for example, linear or non-linear polymeric molecules.

The first type of polymers has been used, for example, in the polymer mixtures as they are described the article mentioned hereinbefore in Journal of Polymer Science. The preparation of this type is described in EP-A-0 076 539.

Suitable non-linear polymeric molecules are, for example, the polymers having a comb structure. These can be obtained, for example, by grafting several chains of a polyvinyl-aromatic compound, for example, polystyrene on a chain of a polyalkyl(meth)acrylate. In order to obtain a polymer having a comb structure it is also possible to use a polystyrene having a reactive terminal group. The terminal group is chosen so that it can be incorporated in a polyalkyl(meth)acrylate chain. An example of such a polystyrene is a polystyrene having terminal alkyl(meth)acrylate groups.

Non-linear polymers having a main chain derived from a vinylaromatic monomer and having polyalkyl(meth)acrylate side chains are also suitable.

In the vinylaromatic alkyl(meth)acrylate copolymer as it is used in the polymer mixture according to the invention, the relative quantity of vinylaromatic units to alkyl(meth)acrylate units may be chosen between very wide limits, for example, between 5:95 and 95:5 preferably between 25:75 and 75:25.

Examples of suitable alkyl(meth)acrylates are methyl- or ethylmethacrylate and methyl- or ethylacrylate. In general, acrylates or methacrylates having an alkyl group which comprises 1-6 carbon atoms are to be preferred.

D. BLOCK POLYMER

The polymer mixture according to the invention comprises an, optionally partially hydrogenated, block copolymer having one or more blocks derived from conjugated diene units and having one or more blocks derived from vinylaromatic units.

The known block copolymers having blocks derived from butadiene and/or isoprene and having blocks derived from styrene may be used in particular. These block copolymers may be partially hydrogenated, which means that the blocks derived from the conjugated diene units then are hydrogenated for the greater part, while the styrene blocks are not hydrogenated.

All the known types of this kind of block copolymers are to be considered: linear diblock- and linear triblock copolymers, radial block copolymers and so on.

In addition to the constituents mentioned hereinbefore sub A, B, C and D, the polymer mixture may comprise one or more of the following constituents:
E. Styrene homopolymer and/or rubber-modified styrene polymer and/or
F. conventional additives.

E. STYRENE HOMOPOLYMER AND/OR RUBBER-MODIFIED STYRENE POLYMER

These are meant to include any polymer which is built up for more than 75 mol % from units derived from units derived from styrene and the rubber-modified modifications thereof. In particular are meant: crystal clear polystyrene built up for more than 100 mol % from units derived from styrene units and so-called high impact polystyrene. In so far as these polymers comprise further copolymerisable units in addition to styrene, they are always random copolymers. This in contrast with the constituents mentioned sub C and D which may be referred to as block copolymers.

F. CONVENTIONAL ADDITIVES

In addition to the constituents mentioned hereinbefore, the polymer mixture according to the invention may comprise one or more of the following constituents: fillers, reinforcing fibres, agents to improve the flame resistance, stabilisers, dyes and/or pigments. As stabilisers may be used the stabilisers generally known for polyamides.

The polymer mixture according to the invention may be prepared according to any method known for the preparation of polymer mixtures. The various constituents are preferably mixed by means of melt extrusion.

The invention will now be described in greater detail, by way of example, with reference to the ensuing specific examples.

EXAMPLE I

Comparative Examples A, B and C

Two samples of a non-linear poly(styrene-methylmethacrylate) were prepared via a free radical polymerisation of methyl methacrylate and 2-polystyrylethylmethacrylate having a molecular weight of 13,000. In this manner two copolymers were obtained: copolymer I having a methyl methacrylate content of 64% by weight and a molecular weight of 58,000 and a copolymer II having a methyl methacrylate content of 68% by weight and a molecular weight of 64,000. The structure of the copolymers I and II consists of a long polymethacrylate chain with polystyrene side chains (comb structure).

The copolymers I and II were mixed in an extruder adjusted at an average temperature of 270° C. with one or more of the following constituents:
a polyphenylene ether, namely poly(2,6-dimethylphenylene-1,4-ether) having an intrinsic viscosity of approximately 49 ml/g measured at 25° C. in chloroform;
polyvinylidene fluoride having a melt flow index according to ASTM D 1238 of 4 g/min. at 230° C. and a load of 5 kg;
a styrene/ethylene-butylene/styrene triblock copolymer having a weight ratio styrene to ethylene-butylene of 27 to 73. The total molecular weight is 74,000; the molecular weight of each of the styrene blocks is 10,000 and of the ethylene butylene block it is 54,000.

The quantities used are recorded in Table A hereinafter.

Test pieces for determining the tensile strength at fracture, the elongation at fracture, and the IZOD notch impact value were manufactured (by injection moulding) from the resulting polymer mixtures. The values found are also recorded in the table hereinafter.

TABLE A

| Example | I | A | B | C |
|---|---|---|---|---|
| Composition (parts by weight) | | | | |
| polyphenylene ether | 45 | 45 | 45 | 45 |
| polyvinylidene fluoride | 55 | 55 | 55 | 55 |
| copolymer I | — | — | — | 43 |
| copolymer II | 43 | — | — | — |
| triblock copolymer | 14.5 | — | 14.5 | — |
| Properties | | | | |
| Tensile strength at fracture (MPa) | 37 | 26 | 26 | 40 |
| Elongation at fracture (%) | 161 | 5 | 8 | 113 |
| IZOD notch impact value (J/m) | 136 | 34 | 54 | 15 |

It may be seen from the properties as recorded in Table A that the addition of copolymer I to a mixture of a polyphenylene ether and a polyvinylidene fluoride leads to an increase of the tensile strength and of the elongation: the notch impact value, however, deteriorates (comparative examples A and C). The addition of a triblock copolymer (comparative example B) leads to a small improvement of the notch impact value, while the tensile strength and the elongation remain approximately the same.

As a result of the addition of a triblock copolymer and a copolymer (see example I) the tensile strength and the elongation become larger, while in addition the notch impact value is increased to a much stronger extent than would be expected on the basis of comparative example B.

We claim:

1. A polymer mixture with improved impact strength and elongation at fracture without significant reduction in tensile strength which comprises a polyphenylene ether, a fluorine-containing olefinic homopolymer or copolymer and a vinylaromatic-alkyl(meth)acrylate copolymer, characterised in that the polymer mixture comprises:
   A. 30-70% by weight of a polyphenylene ether,
   B. 30-70% by weight of a fluorine-containing olefinic homopolymer or copolymer, the weight percentages of A and B being calculated with respect to the sum of the quantities by weight of A plus B,
   C. 1-80 parts by weight of a non-linear vinylaromatic alkyl(meth)acrylate copolymer, and
   D. 1-20 parts by weight of an, optionally partially hydrogenated, block copolymer having one or more blocks derived from conjugated diene units and having one or more blocks derived from vinylaromatic units.

2. A polymer mixture as claimed in claim 1, characterised in that as constituent C the polymer mixture comprises a copolymer having non-linear structure built up from a polyalkyl(meth)acrylate main chain with polystyrene side chains.

3. A polymer mixture as claimed in claim 1, characterized in that the polymer mixture comprises as constituent C a copolymer having a non-linear structure built up from a polystyrene main chain with polyalkyl(meth)acrylate side chains.

4. A polymer mixture as claimed in claim 1, characterised in that the polymer mixture comprises 1-50 parts by weight of constituent C per 100 parts by weight of A plus B.

5. A polymer mixture as claimed in claim 1, characterised in that the polymer mixture comprises as constituent B a homopolymer or copolymer which is built up for more than 25 mol % from units derived from vinyl fluoride, vinylidene fluoride or a mixture thereof.

6. A polymer mixture as claimed in claim 5, characterised in that constituent B consists of polyvinylidene fluoride, polyvinyl fluoride or of a mixture of polyvinylidene fluoride and polyvinyl fluoride.

7. A polymer mixture as claimed in claim 5, characterised in that constituent B is a copolymer built up on the one hand from units derived from vinylidene fluoride, vinyl fluoride or vinylidene fluoride and vinyl fluoride and on the other hand from units derived from hexafluoropolypropylene, chlorotrifluoroethylene, tetrafluoroethylene or a mixture of any of the foregoing.

8. A polymer mixture as claimed in claim 5, characterised in that constituent B is a copolymer of vinylidene fluoride and vinyl fluoride.

9. A polymer mixture as claimed in claim 5, characterized in that the polymer mixture comprises as constituent B a homopolymer or copolymer which is built up for more than 45 mol % from units derived from vinyl fluoride, vinylidene fluoride or mixtures of the foregoing.

10. A polymer mixture as claimed in claim 1, characterized in that the alkyl(meth)acrylate portion of constituent C is selected from the group consisting of alkyl acrylates, alkyl(meth)acrylates and mixtures of the foregoing wherein the alkyl group comprises 1-6 carbon atoms.

11. A polymer mixture as claimed in claim 10 characterized in that the alkyl(meth)acrylate is selected from the group consisting of methylmethacrylate, ethylmethacrylate, methacrylate, ethacrylate and mixtures of the foregoing.

12. A polymer mixture as claimed in claim 11, characterized in that the ratio of vinyl aromatic units to alkyl(meth)acrylate units is between 5:95 to 95:5.

13. A polymer mixture as claimed in claim 12, characterized in that the ratio of vinyl aromatic units to alkylmethacrylate units is between 25:75 to 75:25.

14. A polymer mixture as claimed in claim 2, characterized in that the alkyl(meth)acrylate portion of constituent C is selected from the group consisting of alkyl acrylates, alkyl(meth)acrylates and mixtures of the foregoing wherein the alkyl group comprises 1-6 carbon atoms.

15. A polymer mixture as claimed in claim 14, characterized in that the alkyl(meth)acrylate is selected from the group consisting of methylmethacrylate, ethylmethacrylate, methacrylate, ethacrylate and mixtures of the foregoing.

16. A polymer mixture as claimed in claim 15, characterized in that the ratio of vinyl aromatic units to alkyl(meth)acrylate units is between 5:95 to 95:5.

17. A polymer mixture as claimed in claim 16, characterized in that the ratio of vinyl aromatic units to alkyl(meth)acrylate units is between 25:75 to 75:25.

18. A polymer mixture with improved impact strength and elongation at fracture without significant reduction in tensile strength consisting essentially of:
(1) a polyphenylene ether;
(2) a fluorine-containing olefin polymer or copolymer;
(3) a non-linear vinyl aromatic alkyl(meth)acrylate copolymer; and
(4) a block copolymer having one or more blocks derived from conjugated diene units and having one or more blocks derived from vinyl aromatic units.

19. A polymer mixture with improved impact strength and elongation at fracture without significant reduction in tensile strength which comprises a polyphenylene ether, a fluorine-containing olefinic homopolymer or copolymer and a vinylaromatic-alkyl(meth)acrylate copolymer, characterized in that the polymer mixture comprises:

A. 30–70% by weight of a polyphenylene ether.
B. 30–70% by weight of a fluorine-containing olefinic homopolymer or copolymer, the weight percentages of A and B being calculated with respect to the sum of the quantities by weight of A plus B,
C. 1–50 parts by weight of a non-linear vinylaromatic alkyl(meth)-acrylate copolymer, and
D. 1–20 parts by weight of an, optionally partially dehydrogenated, block copolymer having one or more blocks derived from conjugated diene units and having one or more blocks derived from vinylaromatic units.

20. A polymer mixture as claimed in claim 19, characterized in that component A is present in an amount of about 45 parts by weight, component B is present in an amount of about 55 parts by weight, component C is present in an amount of about 43 parts by weight and component D is present in an amount of about 14.5 parts by weight.

* * * * *